(12) United States Patent
Czarnecki

(10) Patent No.: US 6,728,087 B1
(45) Date of Patent: Apr. 27, 2004

(54) METHOD AND APPARATUS FOR REMOTELY ACTUATING A CIRCUIT PROTECTION DEVICE

(75) Inventor: Neil A. Czarnecki, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 135 days.

(21) Appl. No.: 09/920,909

(22) Filed: Aug. 2, 2001

(51) Int. Cl.$^7$ ................................................. H02H 9/00
(52) U.S. Cl. ............................. 361/58; 361/54; 361/56; 361/46; 361/196
(58) Field of Search ............................... 361/58, 54, 56, 361/64, 66, 68, 93, 115, 117, 118, 119, 187, 93.2, 94

(56) References Cited

U.S. PATENT DOCUMENTS

| | | | |
|---|---|---|---|
| 2,994,805 A | 8/1961 | Nash | 317/22 |
| 3,436,695 A | 4/1969 | Dessert | 335/9 |
| 3,703,664 A * | 11/1972 | Cronin | |
| 3,868,550 A * | 2/1975 | Knauer et al. | |
| 4,164,719 A | 8/1979 | Young et al. | 335/14 |
| 4,456,832 A | 6/1984 | Greer et al. | 307/38 |
| 4,589,052 A | 5/1986 | Dougherty | 361/94 |
| 4,598,263 A | 7/1986 | Heyne et al. | 335/14 |
| 4,639,612 A | 1/1987 | Bowman-Jones | 307/132 |
| 4,691,180 A | 9/1987 | Grunert et al. | 335/6 |
| 4,700,161 A | 10/1987 | Todaro et al. | 335/172 |
| 4,794,356 A | 12/1988 | Yu et al. | 335/13 |
| 4,804,862 A | 2/1989 | Bowman-Jones et al. | 307/140 |
| 4,825,096 A | 4/1989 | Fabrizi et al. | 307/112 |
| 4,926,282 A | 5/1990 | McGhie | 361/102 |
| 5,301,083 A | 4/1994 | Grass et al. | 361/64 |
| 5,805,041 A | 9/1998 | Castonguay et al. | 335/177 |
| 5,966,281 A * | 10/1999 | Larson | |
| 6,034,581 A | 3/2000 | DiMarco et al. | 335/16 |
| 6,437,955 B1 * | 8/2002 | Duffy et al. | |

* cited by examiner

*Primary Examiner*—Dean A. Reichard
*Assistant Examiner*—Nguyen T. Ha
(74) *Attorney, Agent, or Firm*—Andrus, Sceales, Starke & Sawall, LLP

(57) ABSTRACT

A method and apparatus for remotely operating a circuit protection device, such as a circuit breaker, to move the circuit protection device to an open condition to disconnect a load from a power source. The apparatus includes a control circuit positioned externally from the circuit protection device. The control circuit includes an impedance limiter and a switching device connected in series with each other. The impedance limiter and switching device are positioned in parallel with the load. The switching device can be remotely actuated to move between an open position and a closed position. When the switching device is in the closed position, the impedance limiter draws a supply of current through the impedance limiter. The size of the impedance limiter is selected such that the current drawn from the power source is greater than the trip current required to move the circuit protection device to the open position. Thus, the switching device can be used to remotely actuate the circuit protection device.

11 Claims, 2 Drawing Sheets

METHOD AND APPARATUS FOR REMOTELY ACTUATING A CIRCUIT PROTECTION DEVICE

BACKGROUND OF THE INVENTION

The present invention generally relates to a method and apparatus for remotely controlling the operation of a circuit protection device, such as a circuit breaker. More specifically, the present invention is an apparatus externally connected to a circuit breaker that causes the contacts of the circuit breaker to open in response to a signal generated by a remotely located control circuit.

Previously, it has been known to provide a circuit breaker including a shunt trip apparatus that allows the breaker to be selectively operated to its tripped condition from a remote location. The shunt trip feature is commonly provided by adding a separate enclosure to the side of an existing molded circuit breaker. Typically, the separate enclosure contains a shunt trip element, such as a solenoid or lever system, that is coupled to the circuit breaker through a linking arrangement extending through the outer walls of the molded circuit breaker case.

Although this type of shunt trip apparatus allows the circuit breaker to be remotely operated, the shunt trip apparatus requires modification to the standard circuit breaker housing and the inclusion of additional operating components, such as a separate set of contacts and/or operating devices such as a solenoid. Examples of this type of shunt trip circuit breaker are illustrated in U.S. Pat. Nos. 6,034,581; 5,301,083; and 4,804,862.

In addition to the shunt trip type of remotely actuated circuit breakers, U.S. Pat. No. 4,616,206 teaches a circuit breaker having a remotely located switch that draws current through the tripping mechanism within the circuit breaker. The supply of current down through the tripping mechanism moves an SME element in the breaker, thereby allowing the breaker to move to its tripped position. However, the mechanism illustrated in the '206 patent requires a special connection to the internal components of the circuit breaker and draws current through a portion of the breaker that does not receive current during normal circumstances.

Therefore, a need exists for an apparatus that can remotely trip a circuit breaker without requiring separate mechanical or electromechanical components to be incorporated into the operating components of the circuit breaker. Further, a need exists for an apparatus that is located remotely from the circuit breaker and does not have any physical connections to the breaker. Additionally, a need exists for an apparatus that allows the circuit breaker to operate in a normal fashion while being able to quickly move the contacts to an open position.

SUMMARY OF THE INVENTION

The present invention is a method and apparatus for remotely activating a circuit protection device, such as a circuit breaker, to cause the circuit protection device to open and create an open circuit between a power source and a load. More specifically, the present invention is a control circuit that can be connected to the load side of a circuit breaker and operated to cause a surge of current to flow through the circuit breaker to open the contacts of the circuit breaker upon command.

The control circuit of the present invention includes an impedance limiter and a switching device connected in series with each other across the power supply. The impedance limiter includes one end connected to the load side of the circuit breaker and another end coupled to the switching device. Preferably, the impedance limiter is a resistor having a selected resistance such that when the resistor is connected between the circuit breaker and ground, the impedance limiter draws a supply of current from the power source sufficient to cause the contacts of the circuit breaker to move to an open position.

The switching device of the present invention includes an internal switch that allows the switching device to move between an open position and a closed position. When the switching device is in the open position, an open circuit is present between the impedance limiter and ground. When the switching device is moved to a closed position, the impedance limiter is connected to ground potential through the switching device. Thus, when the switching device is closed, the impedance limiter draws current from the power source through the circuit breaker.

The switching device and the impedance limiter of the present invention are located externally from the circuit breaker and can be connected to any type of circuit breaker currently available. Further, the external connection between the impedance limiter and the circuit breaker does not require any internal connections to the operating components within the circuit breaker.

The switching device of the present invention receives an operating signal from a switching circuit. The switching circuit can be configured to generate an operating signal upon detecting a desired parameter. For example, the switching circuit can generate the operating signal if the voltage of the power source exceeds an over voltage reference value or falls below an under voltage reference value.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
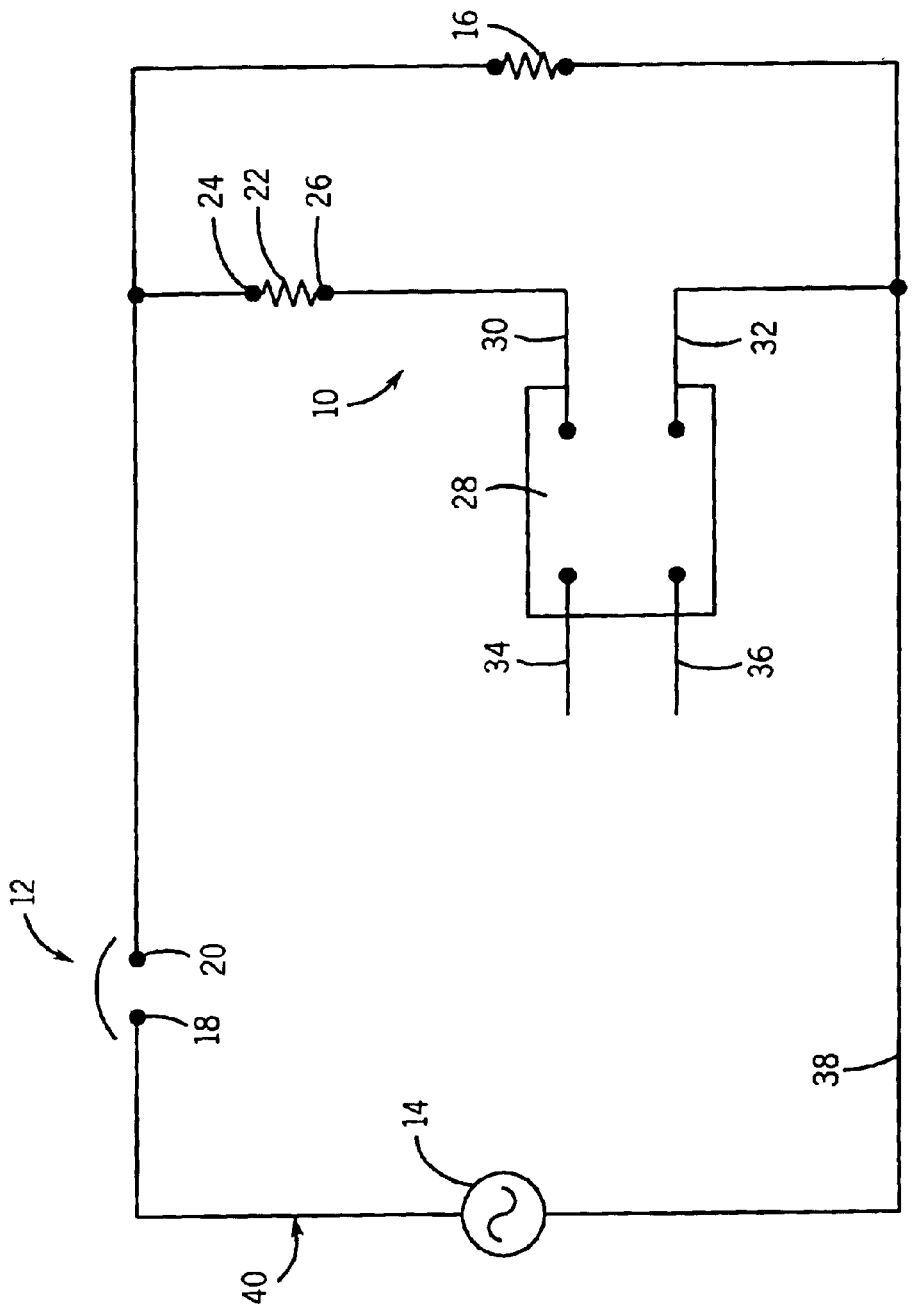
FIG. 1 is a schematic illustration of an apparatus for remotely actuating a circuit breaker in accordance with the present invention.

FIG. 1 illustrates a control circuit 10 of the present invention used to remotely actuate a circuit protection device, such as a circuit breaker 12. As illustrated in FIG. 1, the circuit breaker 12 is positioned in a conventional electric circuit between a power source 14 and an electric load 16. As can be understood in FIG. 1, the power source 14 can be any source of electric power, such as the AC line source illustrated. Further, the electric load 16 can be any type of electronic appliance or device that is operated by current and voltage from the power source 14.

The circuit breaker 12 is a conventional device having a supply terminal 18 connected to the power source 14 and a load terminal 20 connected to the electric load 16. The circuit breaker 12 includes at least a pair of internal contacts movable between an open position and closed position. During normal operation of the load 16, the contacts are positioned in a closed position. In the normally closed position, the circuit breaker 12 allows current to flow from the power source 14 to the load 16. The circuit breaker 12 is configured such that when the flow of current from the power source 14 to the electric load 16 exceeds a rated trip current for the circuit breaker 12, the internal contacts of the circuit breaker 12 open to disconnect the electric load 16 from the power source 14. Operation of the circuit breaker 12 as a device to provide overcurrent protection is well known.

The circuit breaker 12 includes an external actuation handle that allows a user to manually operate the circuit breaker between the open and closed positions. However, a need has arisen for the remote actuation of the circuit breaker 12 separate from the physical movement of the circuit breaker handle between its open and closed positions. The present invention provides a control circuit 10 that is located externally from the circuit breaker 12 that permits remote activation of the circuit breaker 12 from its closed position to its open position.

As can be seen in FIG. 1, the control circuit 10 includes an impedance limiter 22 having its first end 24 connected to the load terminal 20 of the circuit breaker 12. In the preferred embodiment of the invention, the impedance limiter 22 is a conventional resistor having a first end 24 and a second end 26.

The second end of the impedance limiter 22 is connected to a switching device 28. In the preferred embodiment of the invention, the switching device 28 is shown as an electronic relay having an input terminal 30, an output terminal 32 and a pair of control terminals 34 and 36. Although an electronic relay is shown as the preferred embodiment of the invention, it should be understood that the switching device 28 could be replaced by a contactor, a solid state relay, a triac, a silicone controlled rectifier, a gate-turn off thyristor or other type of device operable between an open position and a closed position.

Although not shown in FIG. 1, the switching device 28 includes an internal switch that is movable between an open position and a closed position. When the internal switch is in the closed position, the input terminal 30 is connected to the output terminal 32. Thus, when the switching device 28 is in the closed position, the impedance limiter 22 is connected across the power source 14 between the neutral return line 38 and the line side 40. Further, when the switching device 28 is in its closed position, the impedance limiter 22 is connected in parallel with the electric load 16 across the power source 14. When connected as such, the impedance limiter 22 draws current from the power source 14 through the circuit breaker 12 and through the impedance limiter 22 to the neutral return line 38.

In accordance with the present invention, the value of the impedance limiter 22 is selected based upon the voltage of the power source 14 and the current rating of the circuit breaker 12. Specifically, the impedance limiter 22 is selected such that when the switching device 28 is closed, the impedance limiter 22 will draw a selected amount of current through the circuit breaker 12. Specifically, the size of the impedance limiter 22 is selected such that the amount of current drawn through the circuit breaker 12 by the impedance limiter 22 exceeds the rated value of the breaker 12 and thus creates an overcurrent condition for the circuit breaker. For example, if the circuit breaker 12 is configured to allow up to 5 amps of current to flow through the circuit breaker, the impedance limiter 22 is selected such that when the switching device 28 is closed, the impedance limiter 22 draws more than 5 amps of current through to circuit breaker 12. Thus, when the switching device 28 is closed, the current drawn by the impedance limiter 22 exceeds the rated trip current of the circuit breaker 12, which causes the circuit breaker 12 to open.

As can be understood in FIG. 1, both the impedance limiter 22 and the switching device 28 are located externally from the circuit breaker 12. Thus, the control circuit 10 of the present invention can be connected to the circuit breaker 12 without requiring any internal modifications or changes to the circuit breaker 12. Further, the control circuit 10 of the present invention can be used with any type of circuit breaker 12 regardless of an internal construction of the circuit breaker 12.

As illustrated in FIG. 1, the switching device 28 includes a pair of control terminals 34 and 36 that can receive an electronic signal to control the operation of the internal switch within the switching device 28 between the open and closed positions. Thus, signals appearing on the control terminals 34 and 36 are used to remotely control the internal switch of the switching device 12 and thus the connection of the impedance limiter 22 to the neutral line 38.

Figure 2:
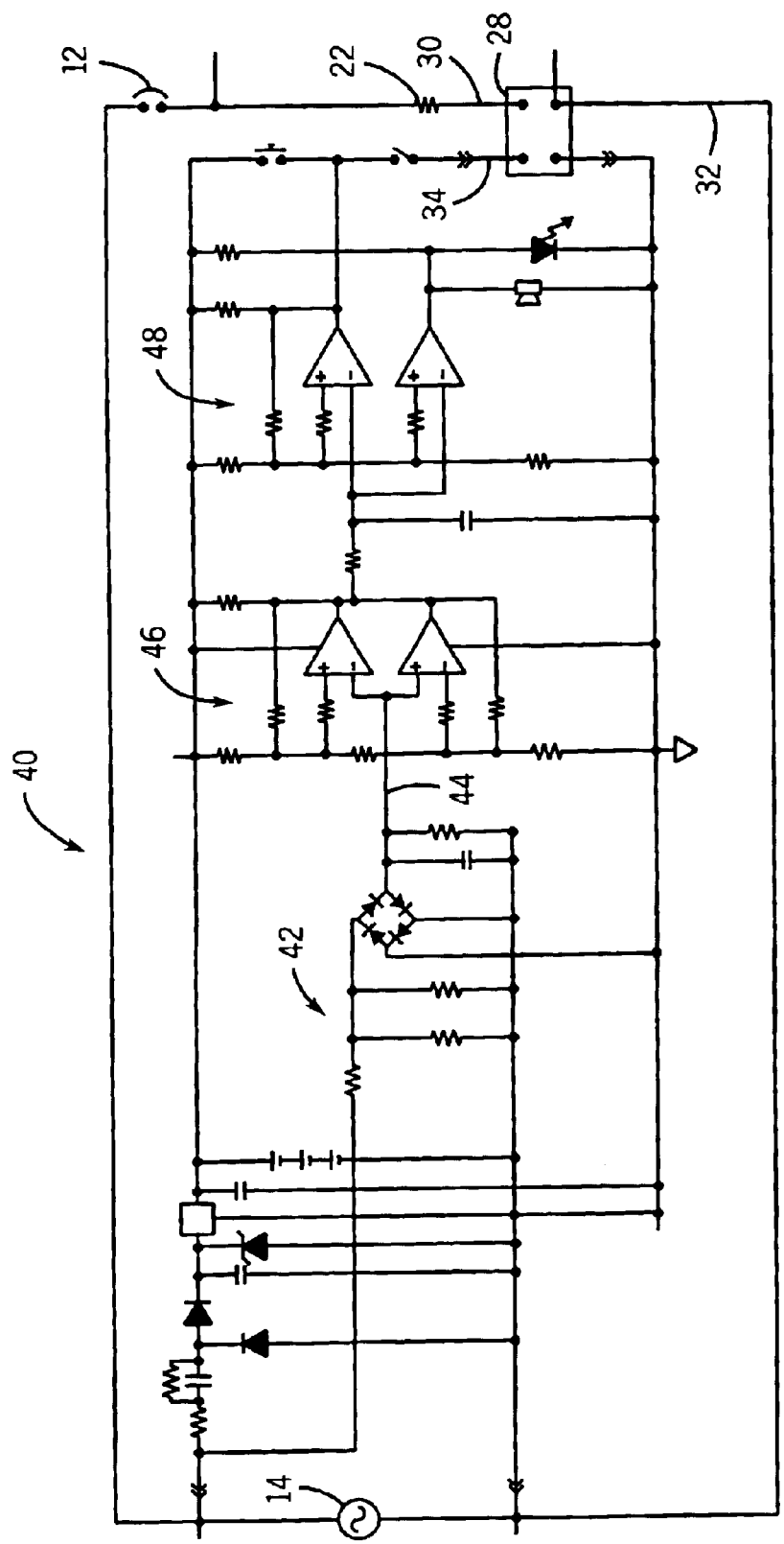
FIG. 2 is a detailed schematic illustrating a proposed configuration of a switching circuit used to control the operation of the switching device illustrated in FIG. 1.

FIG. 2 illustrates a switching circuit 40 connected to the control terminals 34 and 36 of the switching device 28. Although one specific embodiment of the switching circuit 40 is illustrated in FIG. 2, it should be understood that numerous types of switching circuits 40 can be utilized while operating within the scope of the present invention.

In general, the switching circuit 40 is used to provide an activation signal to the control terminals 34 and 36 of the switching device upon detection of a monitored parameter. For example, the switching circuit 40 shown in FIG. 2 is used to provide an activation signal to the switching device 28 upon detecting an over voltage or under voltage situation. Although this specific embodiment is shown, it is contemplated by the inventor that various other monitoring functions could be performed, such as temperature monitoring, load monitoring or any other type of triggering event which the user desires to trigger the disconnection of the load 16 from the power source 14.

In a representative embodiment of the switching circuit 40 shown in FIG. 2, the switching circuit 40 is connected to the power source 14 and monitors the voltage of the power source 14. Specifically, the voltage of the power source 14 is applied to a full wave rectifier 42 that generates a generally DC voltage along line 44. The DC voltage on line 44 is input into a first comparator circuit 46 and a second comparator circuit 48. The first and second comparator circuits 46 and 48 compare the current voltage of the power source 14 to both an over voltage and an under voltage reference value. If the voltage of the power source 14 is greater than the over voltage reference value or less than the under voltage reference value, the switching circuit 40 causes the switching device 28 to move to the closed position. As indicated above, in the closed position the impedance limiter 22 draws current through the circuit breaker 12 in an amount to cause the circuit breaker 12 to open and disconnect the load from the power source 14. Thus, the switching circuit 40 shown in FIG. 2 prevents the load 16 from operating in either an over voltage or under voltage condition.

Various alternatives and embodiments are contemplated as being within the scope of the following claims particularly pointing out and distinctly claiming the subject matter regarded as the invention.

I claim:

1. An apparatus for remotely operating a circuit protection device having contacts movable from a closed position to an open position upon receiving current greater than a trip current, the circuit protection device having a load side and a source side and being connected between a power source and a load being operated by the power source, the apparatus comprising:

an impedance limiter having a first end connected to the load side of the circuit protection device; and a switching device connected between a second end of the impedance limiter and the power source, the switching device being operable in response to a remotely generated activation signal to move between an open position and a closed position, wherein when the switching device is in the closed position, the impedance limiter is connected between the circuit protection device and the power source to draw current through the circuit protection device sufficient to move the contacts of the circuit protection device to the closed position.

2. The apparatus of claim 1 wherein the switching device is an electronic relay operable between an open position and a closed position.

3. The apparatus of claim 1 further comprising a switching circuit coupled to the switching device, wherein the switching circuit is operable to generate the activation signal to control the movement of the switching device between the open position and the closed position.

4. The apparatus of claim 3 wherein the switching circuit monitors the voltage of the power source and operates the switching device based upon the voltage of the power source.

5. The apparatus of claim 1 wherein the impedance limiter is a resistor and the resistance of the resistor is selected based on the voltage generated by the power source such that the current drawn through the resistor when the resistor is connected across the power source exceeds the trip current for the circuit protection device.

6. The apparatus of claim 1 wherein the impedance limiter is positioned in parallel with the load across the power source.

7. The apparatus of claim 1 wherein the impedance limiter and the switching device are located externally from the circuit breaker.

8. The apparatus of claim 1 wherein the impedance limiter is a resistor.

9. A method of remotely actuating a circuit protection device to move the contacts of the circuit protection device from a closed position and an open position, the circuit protection device being movable from the closed position to the open position upon receiving current greater than a trip current, the circuit protection device being positioned between a power source and a load, the method comprising the steps of:

connecting an impedance limiter to the circuit protection device;

positioning a remotely operable switching device between the impedance limiter and the power source, the combination of the switching device and the impedance limiter being connected in parallel with the load across the power source; and supplying an activation signal to the switching device to remotely actuate the switching device to move the switching device from an open position to a closed position, wherein when the switching device is in the closed position, the impedance limiter is connected across the power source to draw current from the power source through the impedance limiter, wherein the impedance limiter is selected such that the current drawn through the impedance limiter upon closing of the switching device is greater than the trip current for the circuit protection device.

10. The method of claim 9 further comprising the step of connecting a switching circuit to the switching device, wherein the switching circuit controls the movement of the switching device between the open and closed positions.

11. The method of claim 9 wherein the switching device and the impedance limiter are located externally from the circuit protection device.

* * * * *